United States Patent
Saad

(10) Patent No.: US 11,151,280 B2
(45) Date of Patent: Oct. 19, 2021

(54) SIMPLIFIED DELETION OF PERSONAL PRIVATE DATA IN CLOUD BACKUP STORAGE FOR GDPR COMPLIANCE

(71) Applicant: EMC IP Holding Company LLC, Hopkinton, MA (US)

(72) Inventor: Yossef Saad, Gannei Tikva (IL)

(73) Assignee: EMC IP Holding Company, LLC, Hopkinton, MA (US)

(*) Notice: Subject to any disclaimer, the term of this patent is extended or adjusted under 35 U.S.C. 154(b) by 371 days.

(21) Appl. No.: 16/431,563

(22) Filed: Jun. 4, 2019

(65) Prior Publication Data

US 2020/0387625 A1    Dec. 10, 2020

(51) Int. Cl.
    H04L 29/06    (2006.01)
    G06F 21/62    (2013.01)
    G06F 21/60    (2013.01)
    G06F 16/16    (2019.01)
    H04L 29/08    (2006.01)

(52) U.S. Cl.
    CPC ........ G06F 21/6245 (2013.01); G06F 16/162 (2019.01); G06F 21/602 (2013.01); G06F 21/6227 (2013.01); *H04L 67/1097* (2013.01)

(58) Field of Classification Search
    CPC .. G06F 21/6245; G06F 16/162; G06F 21/602; G06F 21/6227; H04L 67/1097
    See application file for complete search history.

(56) References Cited

U.S. PATENT DOCUMENTS

| | | | | |
|---|---|---|---|---|
| 6,128,735 A | * | 10/2000 | Goldstein | H04L 9/088 713/166 |
| 10,055,601 B1 | * | 8/2018 | Hamid | H04L 9/0819 |
| 10,616,194 B2 | * | 4/2020 | Cignetti | H04L 63/0428 |
| 10,699,023 B1 | * | 6/2020 | Mokashi | G06F 21/6245 |
| 2011/0179286 A1 | * | 7/2011 | Spalka | G06F 21/6254 713/189 |
| 2014/0052999 A1 | * | 2/2014 | Aissi | H04L 9/08 713/189 |
| 2015/0365385 A1 | * | 12/2015 | Hore | H04L 63/06 713/152 |
| 2016/0127327 A1 | * | 5/2016 | Mehta | G06F 21/6209 713/168 |
| 2016/0321459 A1 | * | 11/2016 | Byszio | H04L 63/0471 |
| 2018/0309739 A1 | * | 10/2018 | Kumhyr | H04L 9/088 |
| 2018/0357426 A1 | * | 12/2018 | Pearson | G06F 21/6254 |
| 2019/0116167 A1 | * | 4/2019 | Johnson | H04L 63/061 |
| 2019/0229908 A1 | * | 7/2019 | Peddada | G06F 21/6209 |
| 2019/0236284 A1 | * | 8/2019 | Hersans | H04L 63/12 |
| 2020/0074105 A1 | * | 3/2020 | Gordon | H04L 63/105 |

* cited by examiner

*Primary Examiner* — Shin-Hon (Eric) Chen
(74) *Attorney, Agent, or Firm* — Barry N. Young

(57) ABSTRACT

In a public cloud that stores data in a database system for a plurality of entities as primary data and as one or more secondary backup copies of the primary data, the data being stored in predefined data fields of data records, personal private data of each entity is stored encrypted using an encryption/decryption key that is unique to each different entity. The encryption/decryption keys are stored in the cloud in a key store of a key management system. To delete the personal private data of a particular entity, as to comply with the right to be forgotten pursuant to GDPR regulations, or otherwise, the encryption/decryption key for that particular entity is deleted from the key store to render permanently inaccessible all copies of that entity's personal private data.

12 Claims, 3 Drawing Sheets

SIMPLIFIED DELETION OF PERSONAL PRIVATE DATA IN CLOUD BACKUP STORAGE FOR GDPR COMPLIANCE

BACKGROUND

This invention relates generally to data management in cloud-based environments, and more particularly to methods and systems for simplified deletion of selected data in backup storage copies.

There are situations where it is desirable to selectively delete or otherwise render inaccessible certain data contained in fields of stored data records. For instance, in the United States HIPPA (Health Insurance Portability and Accountability Act) regulations require that a person's health-related data be kept confidential and not disclosed except to authorized entities; and the European Union has mandated compliance with strict rules on personal data privacy pursuant to the General Data Protection Regulation (GDPR) legislation. GDPR which is broadly applicable to any organization, vendor, or service provider, among other data holders of private personal data of the customers and/or users of the holding entity, requires that such private personal data be maintained confidential and not disclosed to unauthorized recipients. Additionally, a significant provision of GDPR afforded to persons is the "right to be forgotten". This requires holders of a person's private personal data such as names, identification numbers, financial and social security information, credit card data, etc., to erase all or particular parts of such data from data records upon request of the person so that the data are inaccessible. This applies not only to production copies of the data, but also to data residing in all backup copies as well. The penalties on holders of private personal data for failure to comply may be severe.

This requirement to delete a user's personal data, and similar other requirements to make inaccessible certain types of data, poses a complex challenge to organizations which hold both primary and secondary copies of relevant data. Personal data are typically stored in particular predetermined fields of a user's record in a database. Organizations can implement with reasonable effort personal data erasure in a production database by accessing a user's record and either deleting or altering them by overwriting the private data fields with arbitrary or random data. However, it is a bigger challenge to erase or delete these fields in all other copies of the database that are stored as backups on the same or on another storage system, and on disaster recovery copies in another location. There is no easy way to access and delete or alter specific records in database secondary copies which does not require accessing all such copies. To delete these other copies of data, the database copies must be presented by the backup/data recovery system and either attached to a database host for deletion of the relevant data fields, or a special tool must be used for changing these data fields without a database host. Where the copies are at a remote site, or reside on tape with no immediate physical access and must be delivered to a facility where they can be mounted and processed, it is an even more complex and resource-intensive endeavor, especially where the remote copies are stored in a cloud. Such approaches are far too complex and challenging to be acceptable to most organizations.

It is desirable to provide systems and methods which address these and other problems associated with the selective deletion of all primary and secondary copies of certain selected types of data stored in databases, and which afford simple and efficient approaches for the deletion of all copies of selected data. It is to these ends that the present invention is directed.

DESCRIPTION OF PREFERRED EMBODIMENTS

The invention is particularly applicable to application and database systems running in a public cloud and providing as services, such as FaaS ("function-as-a-service") cloud computing services, and will be described in that context. As will become apparent, however, this is illustrative of only one utility of the invention, and the invention may be beneficially employed in other types of systems and contexts.

As will be described, in one aspect the invention affords an approach to deleting all copies of particular selected data, such as personal data of a user, to comply, for instance, with the right to be forgotten. In accordance with an aspect of the invention, access to relevant sensitive data, such as personal data, is restricted to those with proper access permission, and the right to be forgotten is implemented by rendering the sensitive data permanently inaccessible instead of deleting or erasing it. Rendering data permanently inaccessible is equivalent to deletion of the data, and the term "deletion" will be used herein to mean "permanently inaccessible". This is accomplished, in accordance with a preferred embodiment, by maintaining relevant sensitive data encrypted at rest to restrict unauthorized access to the data and deleting the decryption key when it is desired to render the data permanently inaccessible, as will be described. Additionally, in another aspect, as will also be described, the invention preferably uses the gateway API service of the cloud as a mediator between a cloud database and a cloud application to ensure that read/write access to the fields of data records that store the selected user data are encrypted and decrypted as needed for access.

As noted, the invention is especially applicable to public cloud systems that provide database storage services, such as AWS (Amazon Web Service) Aurora or others. In the description that follows, for convenience the invention will be described in reference to the AWS public cloud using its services and terminology. However, other public clouds such as Microsoft Azure, Google Cloud Platform and others offer similar services and may be used as well.

Figure 1:
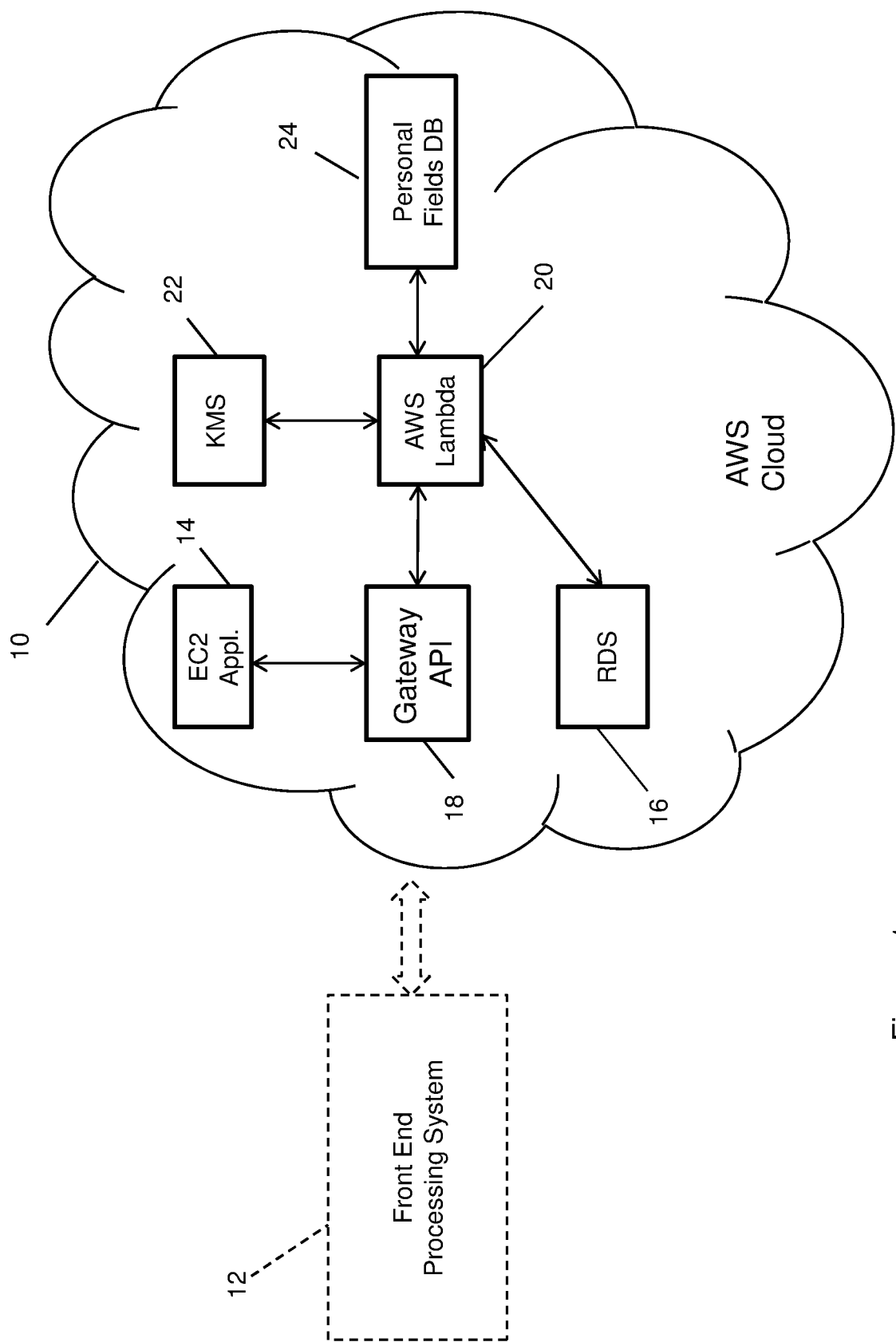
FIG. 1 is a diagrammatic block diagram illustrating a cloud environment comprising an embodiment of a system in accordance with the invention.

FIG. 1 is a diagrammatic block diagram of an AWS public cloud system in which the invention may be deployed. Referring to FIG. 1, a public cloud 10 is typically accessed by an organization's front end processing system, shown at 12 in FIG. 1 for context. Public clouds 10, such as AWS, afford a services platform that offers computing power as virtual processors and memory embodying executable instructions for controlling the operations of the processors, database storage, content delivery and other functionalities that may be defined and configured by users, as desired, without the necessity of providing hardware and software.

Referring to FIG. 1, cloud 10 may comprise an EC2 virtual server compute instance comprising a processor and associated memory running an application 14 that may be a customer resource management (CRM) application that is selected and configured by the customer/user organization or another system for a desired operation. The cloud may further comprise a database storage system 16 that includes the AWS relational database RDS service; a gateway API instance 18 that mediates between the application and the database system; an AWS Lambda computing platform 20 that runs user-selected code, such as a user-selected encryption/decryption cryptographic algorithm, in response to events and automatically manages computing resources required by that code; and a KMS (key management system) 22 that manages encryption and decryption keys for the cryptographic algorithm. The cloud 10 may also comprise a personal fields database 24 storing information that identifies the data fields of data records as defined by the user organization, as will be described.

The CRM application 14 may be any cloud-based application or system selected by the user organization that processes, manages and stores data as data records in database 16. The data may comprise a separate data record for each of a plurality of different entities of the organization, and each record may comprise a plurality of fields containing different types of data about an entity of the user and to which different access permissions may be applicable. Some of the data types may include sensitive private or confidential personal data about the entities; other fields may contain more general non-private information about entities such as entity identifying information employed by the user to manage an entity. Personal private or confidential information may comprise, for example, client or patient financial or health data to which access must be restricted. The organization may define those fields in the data records which store sensitive private or confidential data and should have restricted access, and those fields that contain personal data about an entity that is non-private and need not be protected. These data fields of data records may be identified along with the sensitivity type of the data each field stores in the personal fields database 24. A user-selected cryptographic function for encryption and decryption performed by the Lambda service 20 may access this personal fields database to determine which data fields are for private data and require encryption and decryption. The cryptographic function is preferably a symmetric encryption/decryption cryptographic algorithm, such as AES-256, for example. The KMS 22 may, in one embodiment, store a unique symmetric encryption/decryption key for each user entity of the organization for use by the encryption/decryption algorithm.

During operation, the organization's application 14 running on a compute instance EC2 accesses the database through API calls via the gateway API 18. The gateway API is preferably configured to serve as a mediator, as will be described in connection with FIG. 2, that activates the cryptographic function provided by the Lambda service 20 to provide encryption and decryption of those personal private data fields of data records as defined in the personal fields database 24. This enables the data record of a user to comprise encrypted fields containing private personal data of an entity to be accessed for reading and writing using the cryptographic function, and to comprise unencrypted fields containing non-private/non-confidential data that may be accessed directly. More importantly, as will also be described, encrypted fields also facilitate easy identification and deletion or rendering inaccessible those data fields that contain sensitive information or private personal data to comply with the right to be forgotten or other access restrictions.

Figure 2:
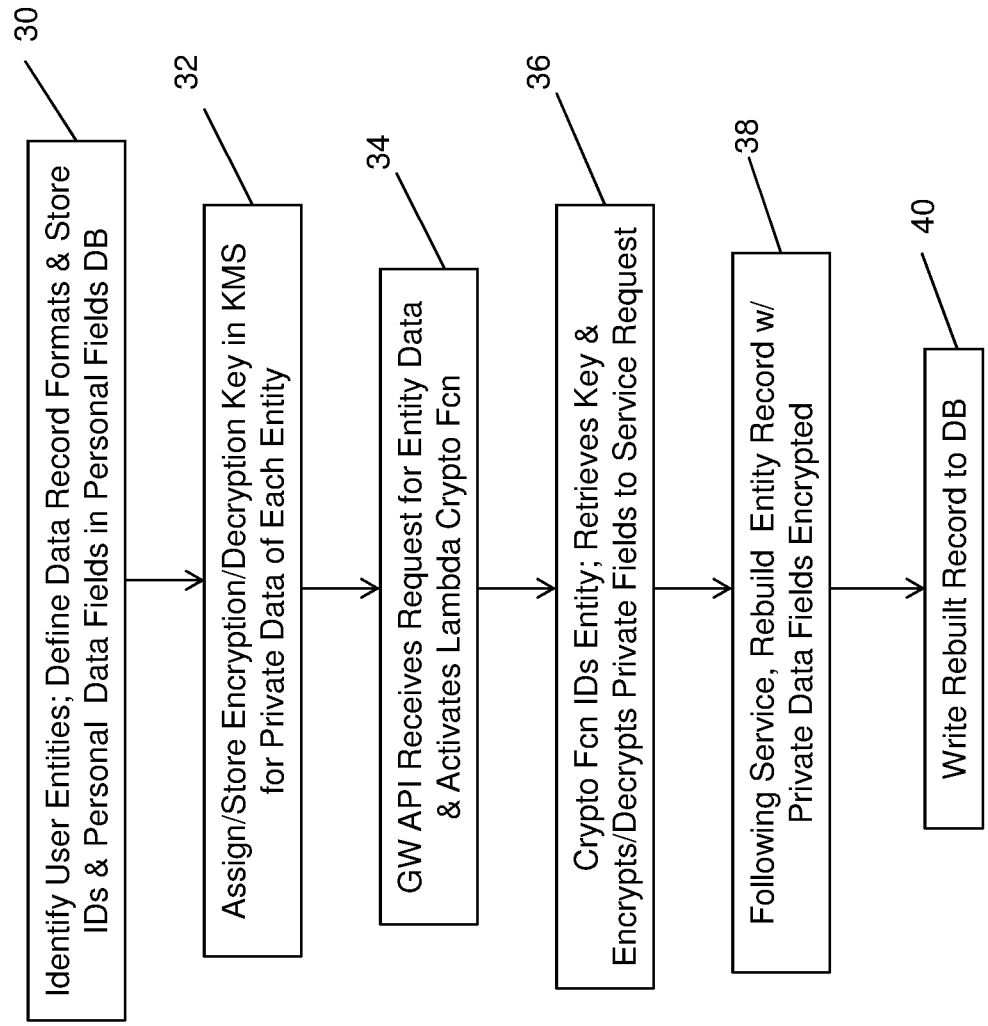
FIG. 2 is a workflow diagram of an embodiment of a process in accordance with the invention for accessing data in the system of FIG. 1.

FIG. 2 is a functional workflow illustrating a process in accordance with an embodiment of the invention for accessing data in the database 16 of the cloud system of FIG. 1. Database system 16 may comprise a primary database for storing primary data, and one or more other databases for storing secondary or backup copies of the primary data. As indicated above, each entity of the organization may have a data record, comprising a plurality of data fields, stored as primary and secondary copies of data in the database. The data fields of a record may contain a mix of data types having different levels of sensitivity and different requirements for protection. In a preferred embodiment as described herein, there may be two types of data and two levels of protection, i.e., sensitive private personal data that must be maintained confidential and other non-sensitive data for which there is no requirement of confidentiality. At step 30 in FIG. 2, the organization may define the format of the particular data fields of data records, including the type of data that is contained in each field and the type or level of sensitivity and the required protection of such data. In an embodiment, all user data records may have the same format so that the corresponding data fields of different user's data records contain the same type of data. The data fields, format and data type of each field of each user's data record may be identified in the personal fields database 24. At 32, the organization may additionally assign to each user an identifier (ID) which is included in an appropriate field of the user's record, and assign and store a unique key to each user in the KMS 22 for use by the cryptographic function for encryption and decryption of that user's records.

As described above and more fully below, the gateway API is preferably configured by the user to act as a mediator between the application and the database. The API may continually and transparently monitor and intercept requests from the application 14 or front end 12 for access to specific user data in the database. As appropriate, the API may call the cryptographic function 20 and retrieve the user's key from the KMS to service the request. This avoids the necessity of tailoring each application that may be running on an EC2 instance in the cloud from being modified to call the cryptographic function, so that the application may request access to user data without regard to whether it is encrypted.

Upon receiving a request at 34 from the application 14 for writing a record, the gateway API 18 may activate the cryptographic function running on the Lambda compute service 20. At 36, the cryptographic function identifies the user and the protected data fields of a data record using information in the personal fields database, and encrypts the data being written to the protected data fields with the user's personally assigned unique key. At 38, the cryptographic function rebuilds the user's data record with the required data fields encrypted, and at 40 writes the rebuilt data record to the database.

Reading a record involves a substantially similar process to writing. Upon receiving a request as from the application 14 for access to read a user's record, the gateway API 18 calls the cryptographic function which identifies the personal private data fields, identifies the user from the ID field of the data record; retrieves the appropriate decryption key from the KMS based upon the user's ID; decrypts the encrypted personal private data fields; rebuilds the record; and returns the record with decrypted fields to the application.

Figure 3:
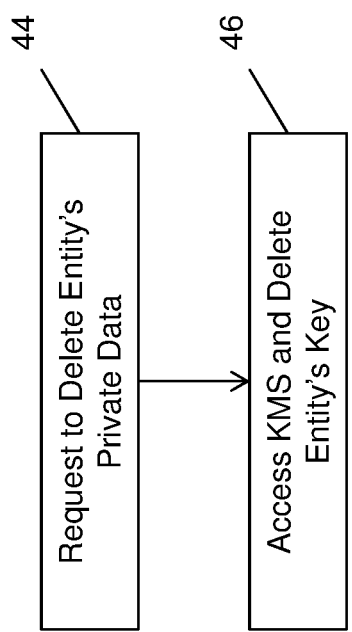
FIG. 3 is a workflow diagram of an embodiment of a process in accordance with the invention for deleting selected data stored in the system of FIG. 1.

Referring to FIG. 3, at 44, when an entity wishes to be forgotten pursuant to GDPR, for instance, or when sensitive data of the entity otherwise needs to be deleted, an administrator or other authorized entity of the organization may, at 46, access the KMS, as from the front end, and simply delete the key that is associated with the entity. With the key deleted, the encrypted data fields remain in the database (in all primary and secondary copies of the data), but both the encrypted primary and secondary copies of the entity's private data are rendered permanently inaccessible, which is equivalent to the data having been deleted. Thereafter, any request for data of the entity will return that entity's data record with the personal private data fields encrypted.

As can be seen, the invention offers a simple and efficient method and system for quickly and seamlessly deleting multiple primary and secondary copies of selected data without the necessity of locating and mounting the multiple copies of the data on a database host or using some other method to delete the data. As such, it affords an easy and efficient way of implementing the GDPR right to be forgotten, as well as for managing data stored in a public cloud to which access may not be possible.

While the foregoing has been with reference to particular embodiments of the invention, it will be appreciated that the principles of the invention are also applicable to other embodiments and uses. For instance, while an embodiment of the invention has been described above for handling only two types of data—sensitive protected personal data and unprotected data, other embodiments of the invention are applicable to handling multiple different types of data having multiple different protection requirements and access restrictions. By defining the data fields of an entity's data records to store different types of data to which different protections are applicable and different entities are authorized access, and by assigning a plurality of different keys to the different data fields, upon the gateway API receiving a request for access to protected fields, the gateway API may access the personal fields database to verify access authorization and retrieve appropriate keys associated with the requested data fields to service the access request. For example, different groups or entities within an organization may have different access permissions. The different keys may be used to control access and afford specific protections to the data.

It will also be appreciated that changes may be made to the embodiments described herein without departing from the principles of the invention, the scope of which is defined by the appended claims.

The invention claimed is:

1. A method of managing data stored in a cloud database system, the data comprising a primary copy of the data and one or more secondary copies of the data, said data comprising a separate data record for each of a plurality of different entities of a user, each said data record having a plurality of different data fields storing different data, the method comprising:
    defining a sensitivity type for the data stored in the data fields of said data records in said cloud database system, the sensitivity type comprising, for each entity, private data having restricted access and non-private data having unrestricted access, said private data being stored in the cloud database system in encrypted form using a different encryption key for each entity, and said non-private data being stored in unencrypted form;
    storing information in the cloud identifying for each entity the data fields of a data record of said each entity that contain private data in encrypted form, and storing in a key store in the cloud a decryption key for each different entity; and
    deleting the private data of a selected entity by deleting the decryption key in said key store in said cloud of the selected entity to render the private data of the selected entity inaccessible, wherein there are different classes of private data stored in said data fields of said data records, each different class of private data of an entity requiring different protection and having a unique encryption/decryption key stored in said key store, and wherein said deleting private data of the selected entity is directed to a particular class of said different classes of private data of the selected entity, and said deleting said decryption key comprises deleting the decryption key for that particular class of private data to render only that particular class of private data inaccessible.

2. The method of claim 1, wherein all said copies of the private data of the selected entity are encrypted using the same encryption key, and said deleting the decryption key renders inaccessible all of said copies of said private data of the selected entity.

3. The method of claim 1, wherein said cloud comprises a first compute instance executing a user-selected encryption/decryption algorithm for encrypting and decrypting private data, and said deleting said private data comprises said encryption/decryption algorithm to delete said decryption key in said key store.

4. The method of claim 3 further comprising a second compute instance in the cloud executing a user-defined application and a gatewayAPI, the gatewayAPI mediating requests from said application for access to entity data in said database system by invoking said encryption/decryption algorithm to service said application requests.

5. The method of claim 1, wherein said private data is encrypted using a symmetric cryptographic algorithm that uses the same key for encryption and decryption.

6. A method of managing data stored in a cloud database system, the data comprising a primary copy of the data and one or more secondary backup copies of the primary data, said data comprising a data record for each of a plurality of different entities, each said data record having a plurality of different data fields, the method comprising:
    defining a sensitivity type for the data stored in the data fields of said data records in said cloud database system, the sensitivity type comprising, for each entity, private data having restricted access and non-private data having unrestricted access, said private data being stored in the cloud database system in encrypted form using a different encryption key for each entity, and said non-private data being stored in unencrypted form;
    receiving a request to delete the private data of a selected entity stored in said cloud database system;
    accessing from a fields database in said cloud information identifying the selected entity and the data fields of a data record of said selected entity that store private data in encrypted form; and
    deleting from a cloud key store a decryption key that is unique to said selected entity and that is necessary for decrypting the encrypted private data fields of the data record of the selected entity, said deleting of the decryption key rendering inaccessible all copies of the private data of the selected entity stored in said database system, wherein there are different classes of private data stored in said data fields of said data records, each different class of private data of an entity having a unique encryption/decryption key stored in said key store, and wherein said request to delete private data of the selected entity is directed to a particular class of private data of the selected entity, and said deleting said decryption key comprises deleting the decryption key for that particular class of private data to render only that particular class of private data inaccessible.

7. The method of claim 6, wherein said deleting comprises accessing the key store and deleting the decryption key of the selected entity from said key store.

8. The method of claim 6 further comprising servicing a request for data of an entity for which personal private data has been deleted by returning by the gateway API the data record of that entity with the personal private data fields encrypted.

9. The method of claim 6, wherein said private data is encrypted using a symmetric cryptographic algorithm that uses the same key for encryption and decryption.

10. Non-transitory storage medium embodying executable instructions for controlling a processor to perform a method of managing of managing data stored in a cloud database system, the data comprising a primary copy of the data and one or more secondary copies of the data, said data comprising a separate data record for each of a plurality of different entities of a user, each said data record having a plurality of different data fields storing different data, the method comprising:

storing data having a sensitivity type in the data fields of said data records in said cloud database system, the sensitivity type comprising, for each entity, private data having restricted access and non-private data having unrestricted access, said private data being stored in the cloud database system in encrypted form using a different encryption key for each entity, and said non-private data being stored in unencrypted form;

storing information in the cloud identifying for each entity the data fields of a data record of said each entity that contain private data in encrypted form, and storing in a key store in the cloud a decryption key for each different entity; and deleting the private data of a selected entity by deleting the decryption key in said key store in said cloud of the selected entity to render said copies of the private data of the selected entity inaccessible, wherein there are different classes of private data stored in said data fields of said data records, each different class of private data of an entity requiring different protection and having a unique encryption/decryption key stored in said key store, and wherein said deleting private data of the selected entity is directed to a particular class of said different classes of private data of the selected entity, and said deleting said decryption key comprises deleting the decryption key for that particular class of private data to render only that particular class of private data inaccessible.

11. The non-transitory storage medium of claim 10, wherein said cloud comprises a first compute instance executing a user-selected encryption/decryption algorithm for encrypting and decrypting private data, and a cloud gatewayAPI that receives a request to delete said private data and causes said encryption/decryption algorithm to delete said decryption key in said key store.

12. The non-transitory storage medium of claim 11 further comprising a second compute instance in the cloud executing a user-defined application, and a gatewayAPI mediating requests from said application for access to entity data in said database system by invoking said encryption/decryption algorithm to service said application requests.

\* \* \* \* \*